United States Patent [19]

Condit

[11] 4,150,811
[45] Apr. 24, 1979

[54] VALVES

[76] Inventor: Paul A. Condit, 10623 Windriver Dr., Houston, Tex. 77070

[21] Appl. No.: 716,516

[22] Filed: Aug. 23, 1976

[51] Int. Cl.² .................................................. F16K 5/06
[52] U.S. Cl. ..................................... 251/315; 251/298
[58] Field of Search ................................. 251/315, 298

[56] References Cited

U.S. PATENT DOCUMENTS

| | | | |
|---|---|---|---|
| 2,549,337 | 4/1951 | Seewer | 251/59 |
| 3,226,082 | 12/1965 | Gulick | 251/315 |
| 3,367,359 | 2/1968 | Johnson | 251/315 |
| 3,380,708 | 4/1968 | Scaramucci | 251/315 |
| 3,795,384 | 3/1974 | Reddy | 251/315 |
| 3,883,113 | 5/1975 | Kolb | 251/315 |
| 3,885,771 | 5/1975 | Baumann | 251/298 |

FOREIGN PATENT DOCUMENTS

| | | | |
|---|---|---|---|
| 619235 | 11/1959 | Italy | 291/315 |
| 128274 | 10/1927 | Switzerland | 251/315 |

*Primary Examiner*—William R. Cline
*Assistant Examiner*—H. Jay Spiegel
*Attorney, Agent, or Firm*—Bernard A. Reiter

[57] ABSTRACT

Valve, wherein a hollow semisphere element serves as the closure or valve element. The semisphere has a circular opening through one of its quadrants, which is aligned with a passage leading to the valve chamber to open the valve, the other quadrant of the semisphere being positioned over the passage to close the valve.

5 Claims, 5 Drawing Figures

U.S. Patent   Apr. 24, 1979   4,150,811
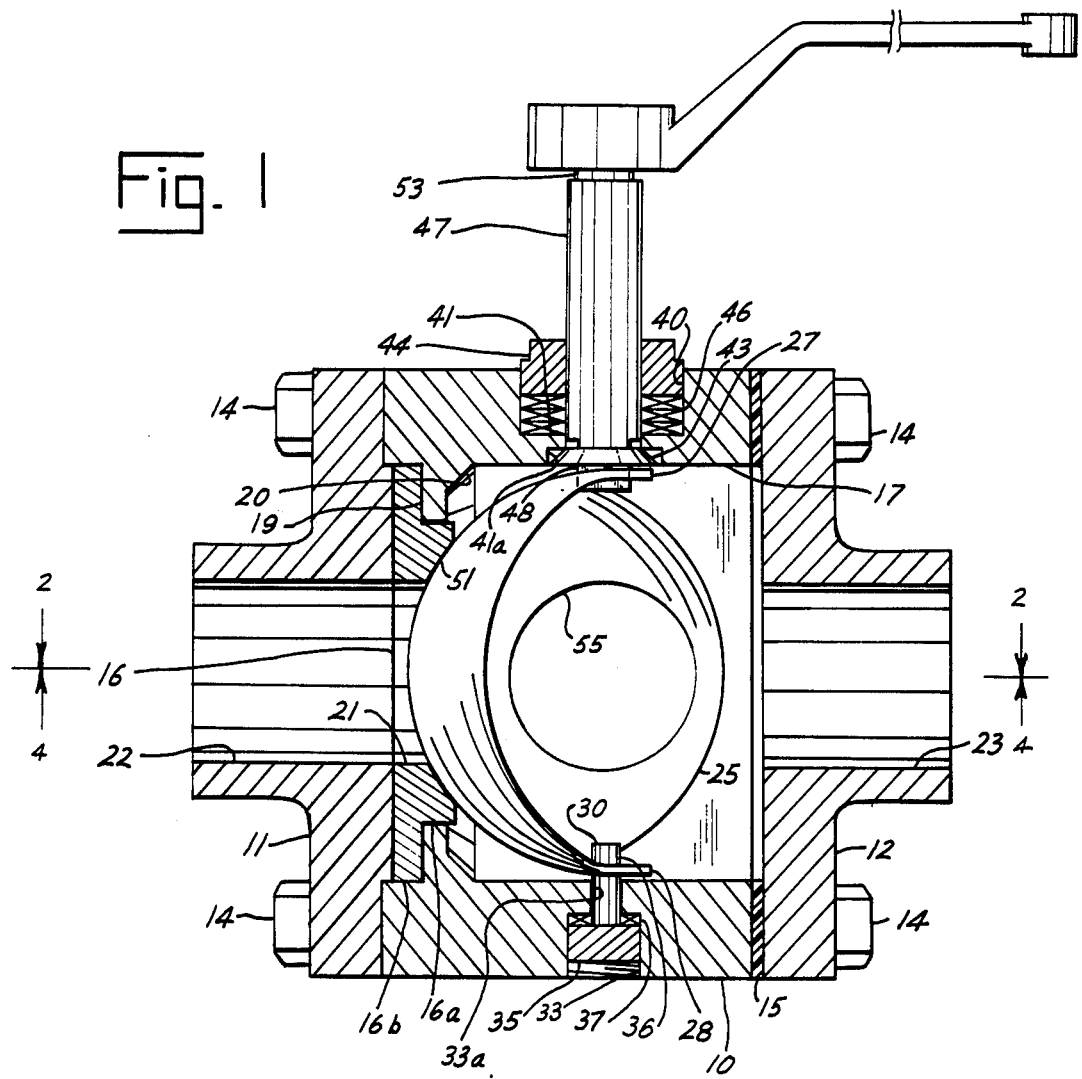
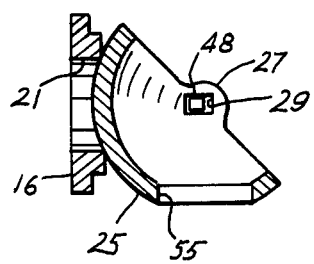
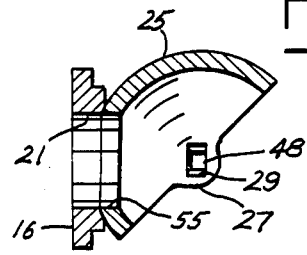

VALVES

BACKGROUND OF THE INVENTION

Ball valves are used for many purposes in industrial and other service. The solid ball elements of such valves are relatively heavy, especially in large valves. Ball valves are desirable in many cases because of their simple operating characteristics and their ability to be opened and closed quickly. For this reason, they are often used at locations where a valve must be closed or opened quickly in case of fire. The relatively heavy weight of such valves may also increase their cost.

SUMMARY OF THE INVENTION

According to the invention, ball valves are provided which are of substantially less weight than conventional ball valves, yet which retain all of the operational features of conventional ball valves and can be made to be reliable for use under fire conditions. The ball closure element is hollow, in the form of a hollow semisphere, so that its weight is greatly reduced. The outer surface of the ball which is used for opening and closing functions of the valve is retained, so that the valve operates in the same manner as a valve having a solid ball closure element. The semiball valve is constructed so that the semiball valve closure element may shift toward the seat when the valve is closed, so that the closure element always contacts the seat in a satisfactory manner for full closure. The valve is brought from full closed to full opened condition, and vice versa, by 90° rotation of the operating lever or handle. The valve is constructed so that in-line inspection of the seats and seals may be easily accomplished.

A principal object of the invention is to provide ball valves of reduced weight. Another object of the invention is to provide such ball valves wherein the closure element is in the form of a semisphere hollowed at its inner side to reduce its weight. A further object of the invention is to provide such valves which retain the operation features of conventional ball valves. Still another object of the invention is to provide such valves which are firesafe when closed. Yet another object of the invention is to provide such valves which are economical, safe and reliable in operation.

Other objects and advantages of the invention will appear from the following description of preferred embodiments thereof, reference being made to the accompanying drawings.

BRIEF DESCRIPTIONS OF THE DRAWINGS

FIG. 1 is a vertical cross section taken through the center of a preferred form of valve according to the invention, the valve being in upright position.

FIG. 4 is a reduced horizontal cross section taken at line 4—4 of FIG. 1, with the valve closure element in closed position.

FIG. 5 is a reduced horizontal cross section similar to FIG. 4, but with the valve closure element in open position.

DESCRIPTION OF THE PREFERRED EMBODIMENTS

Figure 2:
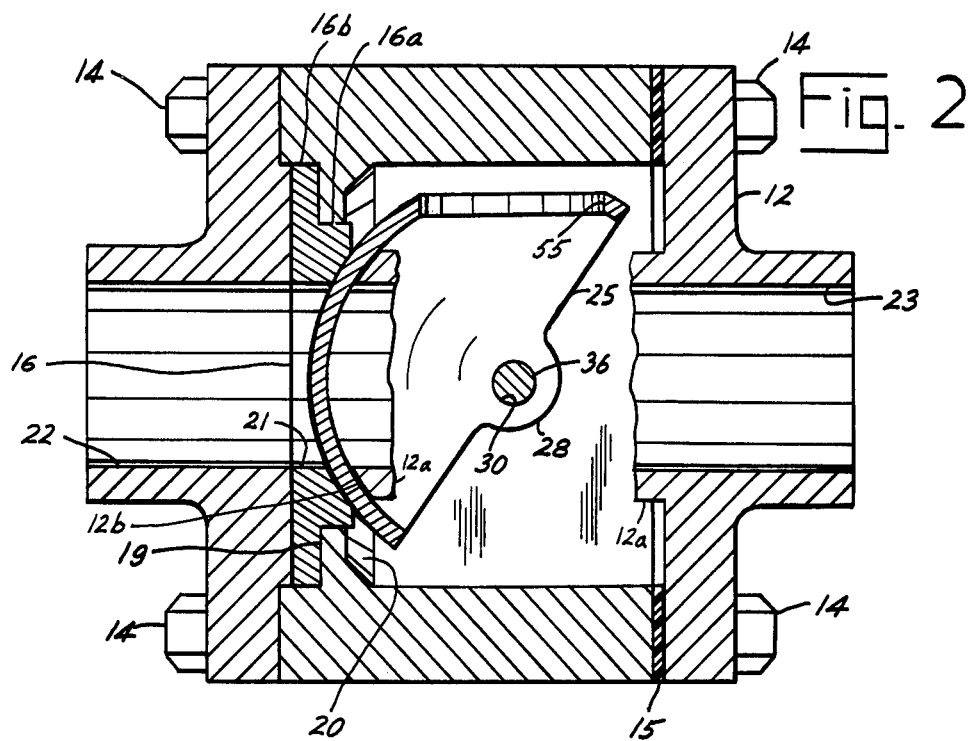
FIG. 2 is a horizontal cross section taken at line 2—2 of FIG. 1.
Figure 3:
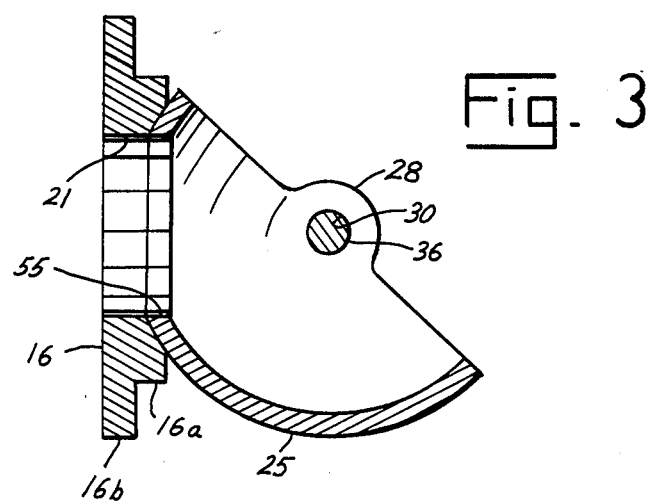
FIG. 3 is a partial horizontal cross section, showing the closure element moved to open position.

Referring now to the drawings in detail, and first to FIGS. 1 and 2, the valve body is made up of a central body element 10 and two flange members 11, 12. The central element 10 is of rectangular cross section in all dimensional directions. Flange members 11, 12 are of rectangular shape to fit the opposite ends of the central body element. Plural bolts 14 screwed into the central body element through holes permitting passage of the bolts through the flanges secure the flanges in place. A gasket 15 is interposed between body 10 and flange 12 to seal therebetween, and a gasket or other seal may be provided between body 10 and flange 11 if desired. At the latter location, however, a seal is provided by the seat member 16, which is sandwiched between body 10 and flange 11.

Body 10 has a passage or chamber 17 of rectangular cross section therethrough. Spaced from the left end of chamber 17, as shown in FIG. 1, a shoulder 19 is provided, which is flat at its side toward seat 16 and which is beveled at 20 at its other side. The seat is circular at its reduced portion 16a as well as at its larger portion 16b. The bevel 20 is square at its outer perimeter and circular at its inner perimeter. The shoulder opening which receives the reduced seat portion 16a is circular.

Seat 16 has a cylindrical flow port 21 concentrically therethrough, and a flow passage 22 of the same diameter is formed through flange 11. Flange 12 has a similar flow passage 23 therethrough as shown.

The closure element 25 is in the form of a hollow semisphere. The outer diameter of the closure element is slightly less that the size of chamber 17, and some clearance between the closure element and the walls of the chamber results. The wall thickness of the closure is preferably uniform, and is such as to be capable of withstanding the internal valve pressures to which it is to be subjected. Upper and lower projecting tab formations 27, 28, respectively, are provided for connection of the closure element into the valve chamber.

A rectangular opening is formed through the valve closure at tab 27, indicated by reference numeral 29. A circular opening 30 is provided through the valve closure at tab 28. A tapped bore 33 is formed through the lower side of the body 10, the bore being reduced and unthreaded at its upper portion 33a. A stem plug 35 is screwed into bore 33, the plug having a concentric stem 36 extending upwardly into opening 30 of the closure. Packing 37 is provided around the lower end of the stem 36 within bore 33 to prevent fluid leakage around the stem from the valve chamber.

A tapped bore 40 is provided into the upper side of the body 10, a shoulder 41 being provided therearound and the bore being reduced and unthreaded at its lower end 40a. A stem or shaft of cylindrical shape is received through bore 40, the stem having an integral outwardly projecting collar formation 43 near its lower end. The collar is circular, and is outwardly beveled as shown. The collar is disposed beneath shoulder 41, within the reduced diameter lower portion of bore 40. An outwardly threaded packing retainer 44 is screwed into bore 40 above packing 46, to form a fluid-tight seal around stem 47. Stem 47 is square in shape at its lower end portion 48, below shoulder 41. Portion 48 of the stem is received into rectangular opening 29 of the closure. The rectangular shape of opening 29 and the square shape of stem portion 48 enable limited movements of the closure 25 at its upper end, in the direction of opening 29's longer dimension. This enables the closure to flushly engage the spherical seat surface 51 at all times, even in the event of seat wear.

The extreme upper end of stem 47 is reduced at 53 and a handle 54 is non-rotatably fixed to the upper stem end. The handle direction may be used as an indicator as to whether the valve is open or closed, and the handle may be directed in whatever direction from the stem is most convenient.

Closure 25 has a circular fluid opening 55 therethrough equidistant from the top and bottom of the closure, and in the quadrant of the closure turned toward the back in FIG. 1. The lefthand quadrant of the closure, as the closure is positioned in FIG. 1, has no opening therethrough, an is employed for closing of the valve. As will be observed, this lefthand quadrant of the closure closes passage 21 through seat 16 when it is disposed thereagainst. When the closure is rotated to bring opening 55 in register with seat passage 21, the valve is fully open. The closure may be rotated to partially overlap opening 55 with passage 21, to partially open the valve, but the valve will most often be used in service where it will be fully opened or fully closed at all times, and not used as a control valve.

Seat 16 as shown is a metal seat. Seats of other materials may be used, for example the seat may be formed of rubber or plastic or any other desired material.

The closure element 25 is, of course, rotated between its open and closed positions by appropriate rotation of handle 54. Ninety degree rotation of the handle will move the closure from open to closed position, in one direction, and ninety degree rotation of the handle will move the closure from closed to open position, in the other direction.

Even in event of failure of the seat, the valve will be closed by movement of the closure element against shoulder 19. The valve is reliable for use where fire safety conditions need to be met.

Referring now again to FIG. 2 of the drawings, a modification is shown which has not been mentioned earlier. The flange element 12, in FIG. 2 only, is shown to have a sleeve formation 12a, the inner end of which forms a seat 12b for seating and sealing against the inside of closure 25. If this modification is provided, the valve will seal in either direction of flow, with the higher fluid pressure to either side of the closure. If higher pressure exists to the left of the closure, the closure will seat against seat 12b. If the pressure is higher to the right of the closure, the closure will seat against seat 16. Seat 12b may be formed by the end of sleeve 12a, or a seat of other material may be affixed at the end of sleeve 12a.

The valve body may be of rectilinear shape as shown, or may be of a hollow globe shape. The flange elements 11, 12 may be made integral with body 10, and a bonnet provided to close the top of the body 10, around stem 47 and the seals therebelow. Such modifications in the form and structure of the valve body are well within the capability of a person of ordinary skill in the art.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:
1. A valve comprising:
a valve body having
a central body portion having a chamber therein and oppositely disposed open ends,
flange elements closing the open ends of the central body portion having flow ports which lead to the chamber, and
a seat around the inner end of one of the flow ports;
a closure element supported within the chamber for rotation about an axis to open and close the valve comprising a semispherical shell having
a portion of its outer surface slidably engaged with the seat
a flow opening which may be rotated into and away from registration with the one flow port in said valve body,
a circular opening through the shell at one side, and
a rectangular opening through the shell at the opposite side with its longer dimension directed parallel to the flow opening;
cylindrical shaft means mounted with said valve body concentric with the axis of rotation and closely received within the circular opening of said closure element; and means extending through said valve body on the side opposite the side mounting said cylindrical shaft means for rotating said closure element about the axis to open and close the valve having square shaft means centered on the axis of rotation and received within the rectangular opening of said closure element whereby said closure element is movable toward and away from the seat when said closure element is in the closed position.

2. The combination of claim 1, said central body portion having an inwardly projecting shoulder formation around said chamber spaced from said end thereof having said one flow port through said flange element at that end, said shoulder formation forming a circular seat opening within its inner perimeter, said seat being removably disposed through said seat opening to a position for engagement with said closure element.

3. The combination of claim 2, said seat element being enlarged outwardly of said shoulder formation and said enlarged portion being removably held between said shoulder formation and the flange element at that end of the valve.

4. The combination of claim 3, said central body portion having oppositely disposed tapped openings through its side walls, said cylindrical shaft means having an exteriorly threaded nut formation at its outer end screwed into one of said tapped openings, packing means disposed between said nut formation and an inwardly projecting annular shoulder provided around the inner portion of the tapped opening, said square shaft means comprising a cylindrical outer portion and a square inner portion and an outwardly projecting annular collar therebetween, said square shaft means being disposed through the other tapped opening with said collar disposed inwardly of an inwardly projecting annular shoulder provided around said other tapped opening, packing means disposed around said cylindrical portion of said square shaft means and a packing gland nut screwed into the outer end portion of said other tapped opening to compress said packing means.

5. The combination of claim 1, including a sleeve extending from the other of said flow ports and slidably engaging the inner surface of said semispherical shell in alignment with both of said flow ports, the inner end of said sleeve being adapted as a seat against which said inner surface of said semispherical shell may seat to close said inner end of said sleeve, whereby said valve may be closed against a relatively higher fluid pressure in either of said flow ports.

* * * * *